US012113645B2

(12) United States Patent
Ludwig et al.

(10) Patent No.: US 12,113,645 B2
(45) Date of Patent: Oct. 8, 2024

(54) METHOD AND SYSTEM FOR AUTOMOTIVE DATA INGESTION

(71) Applicant: BlackBerry Limited, Waterloo (CA)

(72) Inventors: Sue Hsiu Ying Ludwig, Mississauga (CA); Darcy Phipps, Waterloo (CA); Justin Matthew Spalvieri, Waterloo (CA); Mark Savio Macintyre Wheatley, Waterloo (CA); Stephen James Lewis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 15 days.

(21) Appl. No.: 17/841,001

(22) Filed: Jun. 15, 2022

(65) Prior Publication Data

US 2023/0412420 A1 Dec. 21, 2023

(51) Int. Cl.
*H04L 12/40* (2006.01)

(52) U.S. Cl.
CPC .. *H04L 12/40071* (2013.01); *H04L 12/40091* (2013.01); *H04L 12/40189* (2013.01); *H04L 2012/40273* (2013.01)

(58) Field of Classification Search
CPC ......... H04L 12/40071; H04L 12/40091; H04L 12/40189; H04L 2012/40273; G05B 19/4188; G06F 8/61
See application file for complete search history.

(56) References Cited

U.S. PATENT DOCUMENTS

| 5,911,074 A | * | 6/1999 | Leprince | G06F 9/4488 717/100 |
| 2005/0175031 A1 | * | 8/2005 | Harley | H04L 63/0428 370/466 |
| 2011/0228783 A1 | * | 9/2011 | Flynn | G06F 13/4022 370/394 |
| 2020/0242421 A1 | | 7/2020 | Sobhany | |
| 2021/0302941 A1 | * | 9/2021 | Francis | G06F 8/61 |

OTHER PUBLICATIONS

European Patent Office (EPO) Extended European Search Report (EESR) for Application No. 23179327.4-1203, Reference 218174EP dated Oct. 20, 2023, 8 pages.
J.A. Cook & J.S. Freudenberg, "Controller Area Network (CAN)" EECS 461, Fall 2008 (Revised Oct. 13, 2008), 8 pages.

* cited by examiner

*Primary Examiner* — Stephen J Clawson
(74) *Attorney, Agent, or Firm* — Moffat & Co

(57) ABSTRACT

A method at a computing device for providing vehicle data to a client, the method including receiving a data object at an ingestor block at the computing device, the ingestor block comprising a plurality of ingestor instances capable of interacting with different entities; converting the data object to a frame; providing the frame to a translation stack at the computing device to convert the frame into a normalized message; and providing the normalized message to the client.

20 Claims, 9 Drawing Sheets

METHOD AND SYSTEM FOR AUTOMOTIVE DATA INGESTION

FIELD OF THE DISCLOSURE

The present disclosure relates to automotive systems, and in particular relates to data ingestion in automotive systems having varied hardware and software platforms.

BACKGROUND

Modern vehicles have many components and sensors. Such components and sensors may be referred to as data objects, and can be queried and combined to provide insights into the vehicle and the operation of the vehicle.

However, the automotive industry currently includes various hardware and software platforms, and currently needs bespoke customization to obtain data objects.

BRIEF DESCRIPTION OF THE DRAWINGS

The present disclosure will be better understood with reference to the drawings, in which.

DETAILED DESCRIPTION OF THE DRAWINGS

Figure 1:
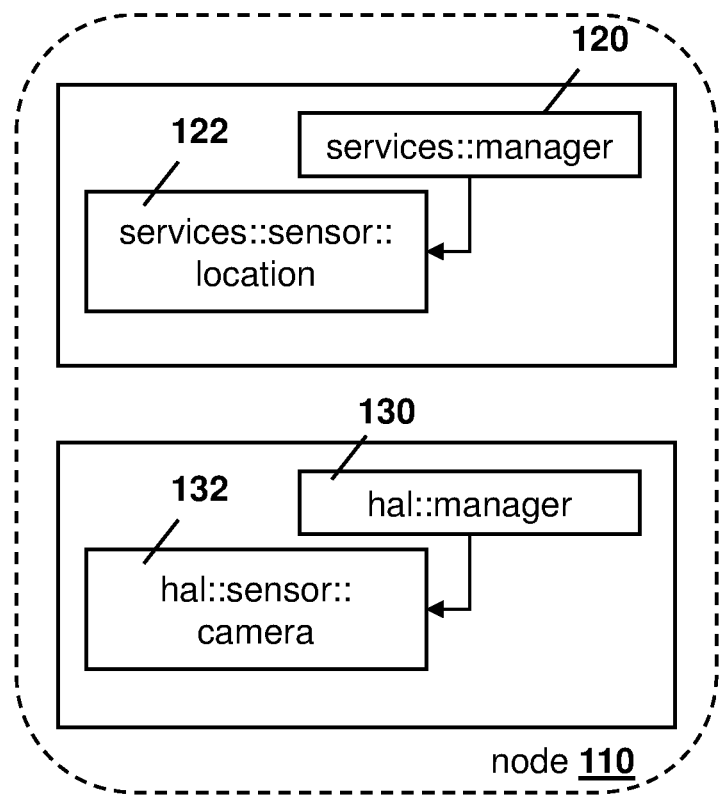
FIG. 1 is a block diagram showing an example computing node within a computer system.

The present disclosure provides a method at a computing device for providing vehicle data to a client, the method comprising: receiving a data object at an ingestor block at the computing device, the ingestor block comprising a plurality of ingestor instances capable of interacting with different entities; converting the data object to a frame; providing the frame to a translation stack at the computing device to convert the frame into a normalized message; and providing the normalized message to the client.

The present disclosure further provides a computing device for providing vehicle data to a client, the computing device comprising: a processor; and a communications subsystem, wherein the computing device is configured to: receive a data object at an ingestor block at the computing device, the ingestor block comprising a plurality of ingestor instances capable of interacting with different entities; convert the data object to a frame; provide the frame to a translation stack at the computing device to convert the frame into a normalized message; and provide the normalized message to the client.

The present disclosure further provides a computer readable medium for storing instruction code, which, when executed by a processor of a computing device configured for providing vehicle data to a client, cause the computing device to: receive a data object at an ingestor block at the computing device, the ingestor block comprising a plurality of ingestor instances capable of interacting with different entities; convert the data object to a frame; provide the frame to a translation stack at the computing device to convert the frame into a normalized message; and provide the normalized message to the client.

In a modern vehicle, information from one or more physical sensors may be processed to create an "Insight" that may be valuable in a system. Such one or more physical sensors and the processing associated therewith may be referred to logically as a micro-service or a Synthetic Sensor (SS). The terms micro-service and Synthetic Sensor are used interchangeably herein.

Synthetic Sensors may exist in other types of applications, including but not limited to medical applications, manufacturing applications, Internet of Things applications, among others, and the present disclosure is not limited to vehicle applications. Vehicle applications are provided for illustration below.

Insight is the term used herein to describe any computer created interpretation of basic sensor data. Insights can be as straight forward as data aggregation or correlation or as complex as artificial intelligence and machine learning. For example, a temperature sensor providing high and low watermarks for notification may be considered an "insight". For location services, geofencing is an insight. For cameras, occupant recognition may be an insight. The use of a combination of sensors such as temperature sensors and cameras, may be used with an artificial intelligence model to determine whether a car seat is occupied in a hot vehicle, which may be an insight. Many other examples of insights are possible.

In one embodiment, the vehicle applications may be implemented in a system providing consistent access to vehicle data and intelligent insights in a way that is familiar and accessible to developer communities. Such environment may allow cloud developers to extend their reach to the edge within the vehicle through the development of Synthetic Sensors which derive intelligent insights on vehicle data using common cloud development technologies and paradigms. Such environment may provide consistent access to vehicle data such that Synthetic Sensors can be written and deployed to a broad vehicle base without bespoke customization.

However, the automotive industry currently uses varied hardware and software platforms. For example, different manufacturers may use different bus protocols, such as a Controller Area Network (CAN) bus and Ethernet, for example. Manufacturers may use different operating systems, such as Linux or QNX, or platforms or services such as Autosar or Vehicle Information Service Specification (VISS), for example. Manufacturers may use different hardware platforms, such as NXP i.MX 8QuadMax or Qualcomm SA8155P, for example. Such variation causes complexity for the obtaining of data objects from a vehicle.

In this regard, in accordance with the embodiments of the present disclosure, a data ingestion framework is provided which allows for data from vehicle sensors to pass to the remainder of the insight generation system in order to create insights that can be provided for vehicle occupants.

Example Vehicle System

The present disclosure will be described with regard to an automotive system with nodes. However, this is merely provided for illustration purposes and the methods and systems described herein could equally be used with any other systems.

For example, reference is now made to FIG. 1 which shows a node 110. A node, as used herein, may be one or a group of electronic control units, central processing units, or kernel controls, among other options, and can be considered as a single computing unit.

In the example of FIG. 1, node 110 includes a services manager 120 which may interact with drivers for sensors that the node is connected to. For example, the node 110 may have access to a location sensor such as a Global Positioning System (GPS) chipset, as shown at block 122.

In order to allow node 110 to interact with modules on other nodes, and to provide functionality with a computing system, a Hardware Abstraction Layer (HAL) may be provided on node 110, which comprises a HAL service 130. Each HAL service 130 is responsible for the integration of a sensor and may provide various functions, including: integration to the underlying sensor; normalization of the sensor data; and/or, if required, providing a barrier between the safety certified and non-certified software. Other functions for the HAL service are also possible.

In the example of FIG. 1, the HAL is provided for camera information, as shown with block 132.

While the example of FIG. 1 shows a node 110 with a single service and a single HAL, this is merely provided for illustration purposes. A node 110 could have a single service without a HAL, a single HAL without a service, a plurality of services with no HAL, a plurality of HALs with no service, and/or a combination of services and HALs.

One example of a system that could use node 110 would be an applications development environment for vehicles. Such applications development environment may develop applications for user experience including comfort, navigation, infotainment, among others, applications for safety, applications for fleet management; applications for performance monitoring; or other such applications for a vehicle environment. In particular, vehicles provide a plurality of sensors and different makes, models or brands may use different sensors with different data formats or values, creating fragmented sensor readings depending on such sensor. This fragmentation impedes the fostering of an application ecosystem that makes use of vehicle data. In addition, low level sensor data is often too granular to be readily useful to applications.

In this regard, the Hardware Abstraction Layer can be used to provide hardware independent sensor interfaces/abstractions which may encapsulate interaction with underlying sensor drivers. The use of the hardware abstraction in the various computing nodes creates a platform that is extensible, can provide barriers between modules to, for example, enforce safety certified systems being separate from other systems, among other options.

Applications do not interact directly with sensor hardware to access sensor data, instead they leverage the Hardware Abstraction Layer. This separation provides a clear distinction between the responsibilities of the HAL (sensor integration and normalizing sensor data) and other abstractions such as a Vehicle Abstraction Layer (VAL), used for managing access to vehicle data and providing value-added insights.

Specifically, insights may leverage sensor data from multiple HALs in order to provide vehicle abstraction and value-added insights. Vehicle insight services in the VAL may control access to a normalized form of vehicle data and provide value-added inferences. Examples of insight services may include a Location Service, which may provide coordinate location data in a consistent format as well as insights such as geo-fencing; a Seat Service, which may provide a myriad of seat information such as belt status, weight, position, and child lock status; a Camera Service which may provide the video stream for in-cabin camera and possibly functions such as conversions and/or clipping; a Battery Service which may provide insights and access to battery such as charge state/consumption/projected hours remaining/projected range; a Door Service which may provide an abstraction for vehicle doors and door status; among others.

Insight Services may leverage sensor data from multiple HALs in order to provide vehicle abstraction and value-add insights. Higher level insights on data enable application developers to create future automotive experiences. As described above, insight is the term used to describe any value-added interpretation of basic sensor data and can be as straight forward as data aggregation or correlation or as complex as artificial intelligence and machine learning.

Nodes with services and HAL managers as described in FIG. 1 may therefore be needed for such application development environment. Node 110 will, in many systems, need to communicate with other nodes, such as other Electronic Control Units (ECUs), Central Processing Units (CPUs), or computing systems, where such ECUs, CPUs, or computing systems may use a different operating system from that of node 110.

In this regard, due to the complexity of the hardware and software in the automotive industry, a data ingestion framework with external Application Program Interfaces (APIs) may be created to allow ingestors for different bus protocols, operating systems, and hardware platforms, among other options. Such ingestors can be created by various parties, as described below.

HAL Service Ingestors (HSI)

In accordance with the embodiments of the present disclosure, a HAL Service Ingestor (HSI) framework is provided to allow hardware and software specific signal integration to occur, and therefore allow the HAL service to be hardware/software agnostic.

Figure 2:
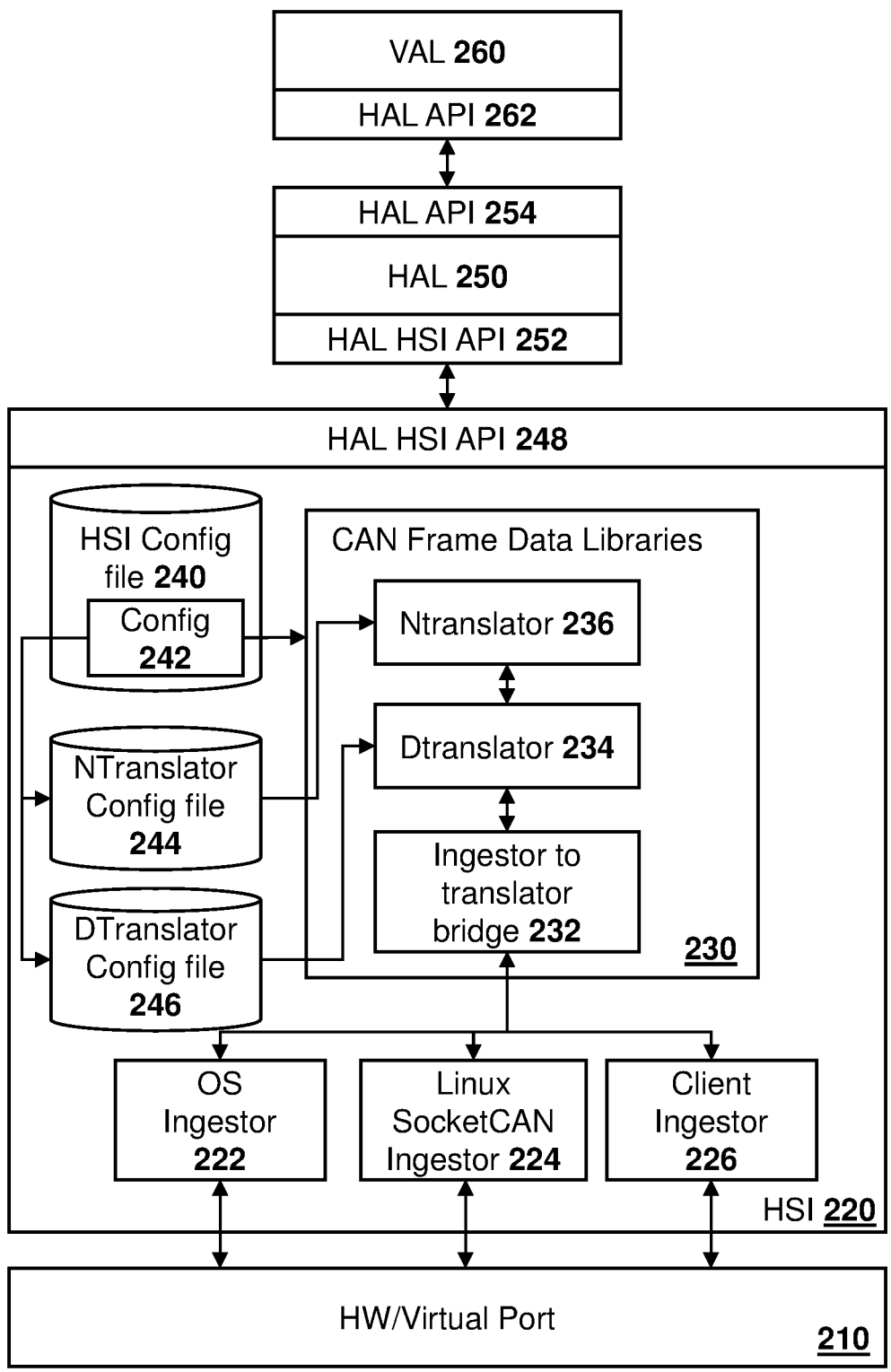
FIG. 2 is a block diagram showing a model for data object consumption.

Reference is now made to FIG. 2. In the embodiment of FIG. 2, a hardware or virtual port 210 could be a link to any hardware or software in a computing system. As described above, hardware and/or software varies across the automotive industry, and therefore a hardware or virtual port 210 could link to different types of operating systems, underlying hardware, or different types of bus architectures.

Communicating with the hardware or virtual port 210 is the HAL Service Ingestor (HSI) 220. The purpose of HSI 220 is to allow data from the hardware or virtual port 210 to be normalized for the hardware abstraction layer.

In particular, HSI 220 includes one or more ingestors. These are shown as OS ingestor 222, Linux SocketCAN ingestor 224 and client ingestor 226. In various embodiments of the HSI, multiple ingestors may exist and may run simultaneously to allow multiple input sources for the HSI 220.

OS ingestor 222 is a operating system dependent ingestor that could be tailored for a particular operating system. For example, OS ingestor 222 could be built for a QNX operating system.

Similarly, Linux SocketCAN ingestor 224 could be tailored for the Linux operating system.

Client ingestor 226 could be a custom ingestor built, for example, by a vehicle manufacturer for a proprietary hardware or software system, among other options.

Ingestors 222, 224 and 226 are merely provided as examples. In practice, ingestors 222, 224 and 226 could be any logical block or instance responsible for interacting with some underlying entity. They could be used for interacting with systems having different bus protocols, operating systems, different hardware platforms, among other options. In some cases, the ingestor could even directly access hardware. In some cases, HSI 220 could have a single ingestor. In some cases, HSI 220 could have multiple ingestors, with only one ingestor running. In some cases, HSI 220 could have multiple ingestors running simultaneously.

Ingestors are therefore specialized for the underlying entity that they communicate with.

In practice, the ingestors could be plug and play, allowing the quick integration of a particular hardware and software model into the insights framework.

The output from the various ingestors could then be provided to a translation service, shown in the example of FIG. 2 as frame data libraries 230. In the example of FIG. 2, frame data libraries 230 are shown as CAN frame data libraries. This is however only provided for illustration, and other frame formats could equally be used with the embodiments of the present disclosure.

In particular, frame data libraries 230 are used to interact with data (frames) from the ingestors and translate the data into a normalized format for the HAL. In this regard, frame data libraries 230 include an ingestor to translator bridge 232 to provide access from the ingestors to the frame data libraries 230. Ingestor to translator bridge 232 may include an API for the ingestors to communicate. In particular, each ingestor may provide data to an API input at the ingestor to translator bridge 232.

The ingestor to translator bridge 232 may further output data using a translator API to various translators. In the example of FIG. 2, a CAN DBC translator (DTranslator) is shown. CAN DBC (CAN database) is a text file that contains information for decoding raw CAN bus data to physical values. Therefore, in the example of FIG. 2, a DTranslator 234 can be used to convert the raw CAN data to interpret CAN messages as particular vehicle signals.

Specifically, DTranslator 234 is an intermediate translator for CAN DBC. In some cases, such translator can utilize the open source C++ library dbcppp, for example. This library contains the logic to convert a CAN frame consisting of an identifier/byte array and converts it into a more readable format using a DBC file. The library exposes the parsed message and signal via classes with the appropriate getters. This data can be used to populate DBCIntermediateForm structures to pass onto the next translation layer.

As will be appreciated by those in the art, if a different type of bus protocol is used than CAN, then the DTranslator 234 can be substituted for a different translator.

Using a translator API, output from the DTranslator 234 can be provided to a normalized translator (NTranslator) 236. In particular, NTranslator 236 is used to convert the data from the DTranslator 234 into a form that would be normal for a HAL service.

For example, the NTranslator 236 may use a JavaScript Object Notation (JSON) structure to convert DBCIntermediateForm structures into the normalized outputs. There could be one NTranslator responsible for all messages or each message could be broken into their own NTranslator.

The output from NTranslator 236 could be provided to higher layers.

Various configuration files could be used to allow for the plug and play of various hardware or software modules into the framework in the example of FIG. 2, an HSI configuration file 240 may contain configuration data 242. Such configuration data may be provided to the libraries 230.

Further, the configuration data may be provided to NTranslator configuration file 244 and to DTranslator configuration file 246.

NTranslator configuration file 244 may provide configuration information to the NTranslator 236. DTranslator configuration file 246 may provide configuration data to DTranslator 234.

The configuration files allow for rules or configuration based conversion of messages to the normalized format.

Output from the NTranslator 236 can be provided, using HAL HSI API 248, to HAL 250, and in particular use HAL HSI API 252.

Once the hardware abstraction layer has completed its tasks, the data can then be provided to vehicle abstraction layer 260 using HAL API 254 on HAL 250 and HAL API 262 on VAL 260.

While the embodiment of FIG. 2 shows a DTranslator 234 and an NTranslator 236, this translation stack is merely provided as one example. In other cases, other translations stacks could be used. Further, HSI 220 could have a single translation stack or multiple translation stacks. In this case, each translation stack could be associated with one or more ingestors. Further, when a plurality of translation stacks exist, such translation stacks could run simultaneously in some cases.

Utilizing the embodiment of FIG. 2, broadly speaking there is an incoming side that controls raw information and an outgoing side that streams decoded information to interested parties.

Elements of FIG. 2 are further described below.

Figure 3:
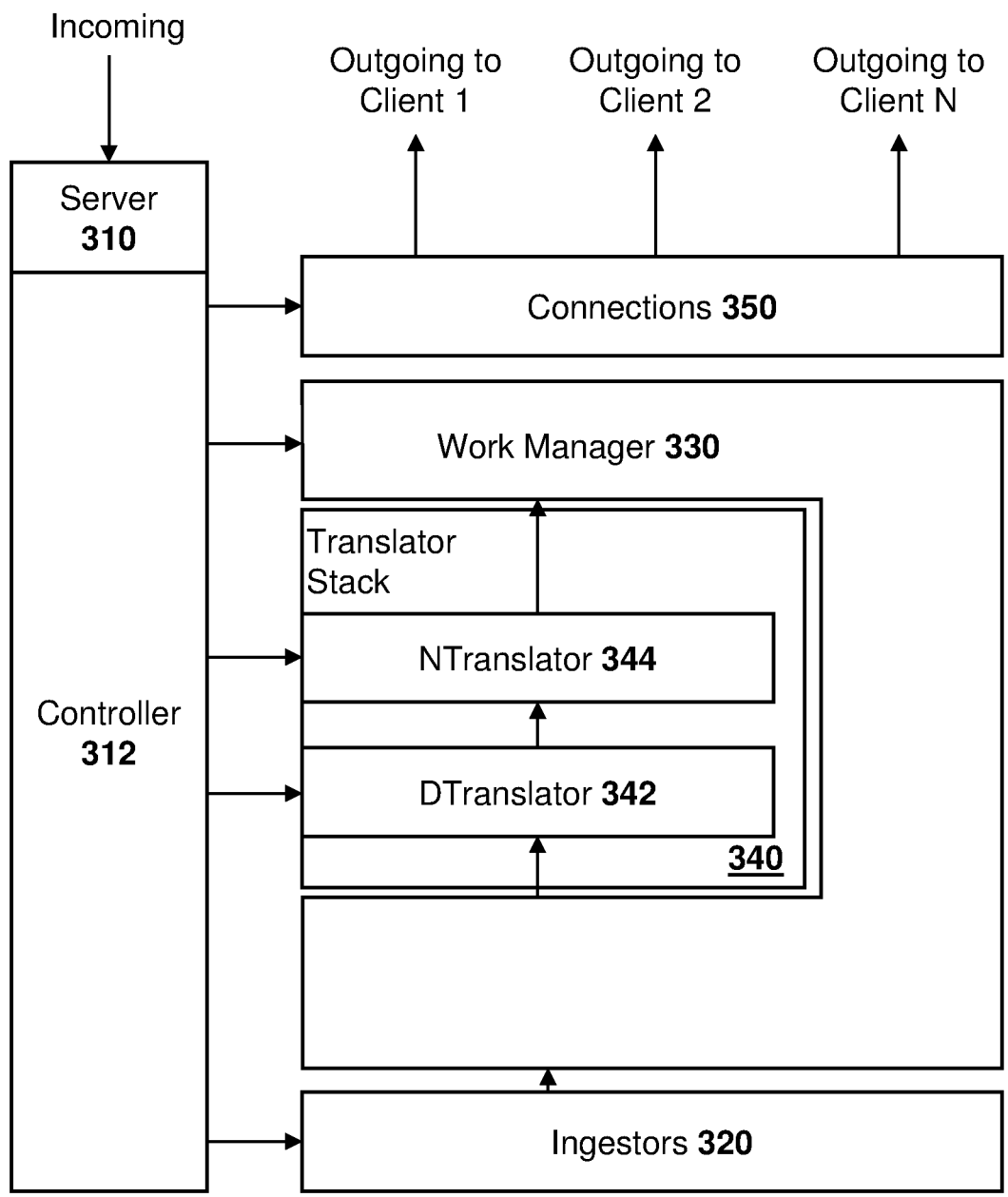
FIG. 3 is a block diagram showing ingestors and translators for data object consumption.

In particular, reference is now made to FIG. 3, which shows the flow of data through various logical components. In particular, incoming data may be provided to a server 310 which includes a controller 312.

Ingestors 320 can receive frames from some underlying source and place them into a queue within a work manager 330. Ingestors 320 are described in more detail below with regard to FIG. 5.

A worker thread within the work manager 330 receives the frames from the queue, blocking the process if no threads are available. Work manager 330 is described below in more detail with regard to FIG. 6.

The worker thread with frames calls through the translator stack 340 to convert the frame into messages. For example, such messages may be referred to as CANMessages if the frames are CANFrames.

In particular, the translator stack 340 includes DTranslator 342 and the NTranslator 344, as described above. Translation stacks are described below in more detail with regards to FIGS. 7A and 7B.

The worker thread with the CANMessages dispatches the CANMessages, in order, to connections 350 for delivery to clients. Connections 350 are described below in more detail with regard to FIG. 8.

In some embodiments, each functional block, and in some cases subcomponents within the functional block, maintain a set of filters. A filter manager may manage such filters. The filters are used to control what data a client of the component utilizing the filter receives. Specifically, a component may have one or more clients that register with that component to receive certain data, and the filter is used subsequently to control the data such clients receive.

In particular, a given client can register multiple filters and registering the same filter multiple times may be allowed. The registration count for each filter may therefore be tracked.

When a block or component has data to report, such block or component passes it through the filter, which may then indicate which clients requested the data.

Figure 4:
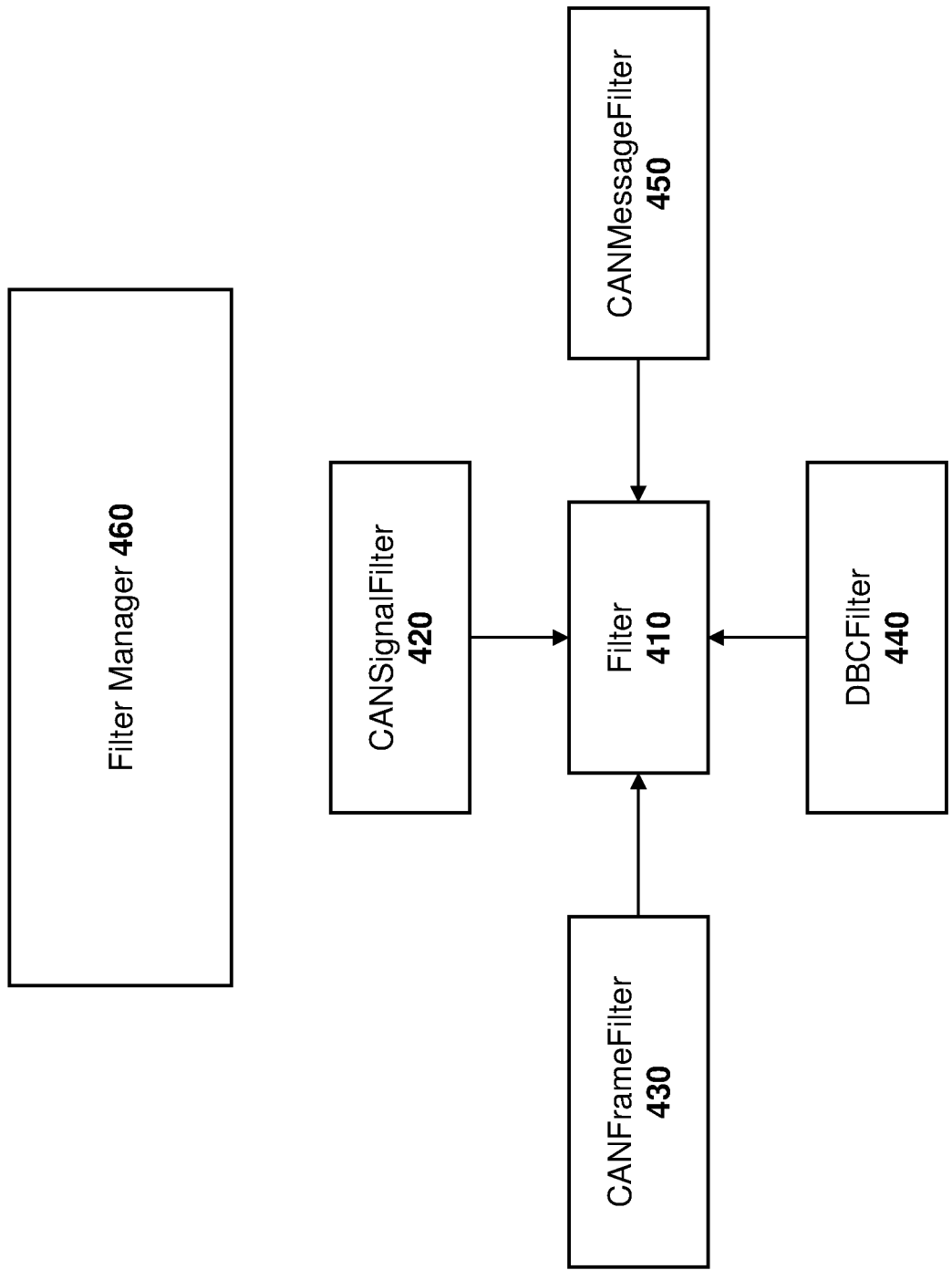
FIG. 4 is a block diagram showing filtering in accordance with some embodiments of the present disclosure.

For example, reference is now made to FIG. 4. In the embodiment of FIG. 4, a filter 410 for a logical component may comprise various types of filters. In the example of FIG. 4, the various types of filters for filter 410 include a CANSignalFilter 420; a CANFrameFilter 430; a DBCFilter 440; and a CANMessageFilter 450. CANSignalFilter 420 can provide filtered results for signals. CANFrameFilter 430 can provide filtered results for frames. DBCFilter 440 can provide filtered results for DBC intermediate messages. CANMessageFilter 450 can provide filtered results for messages.

A filter manager instance may expect a filter of a single type and may work with messages that relate to that type. In this case, a filter manager 460 created to handle CANFrameFilters deals exclusively with filtering CANFrames. A filter manager 460 can be used to have owners register the filters for the data that they are interested in and the manager 460 can manage such data to allow the data to the logical function or block, or to block such data.

Figure 5:
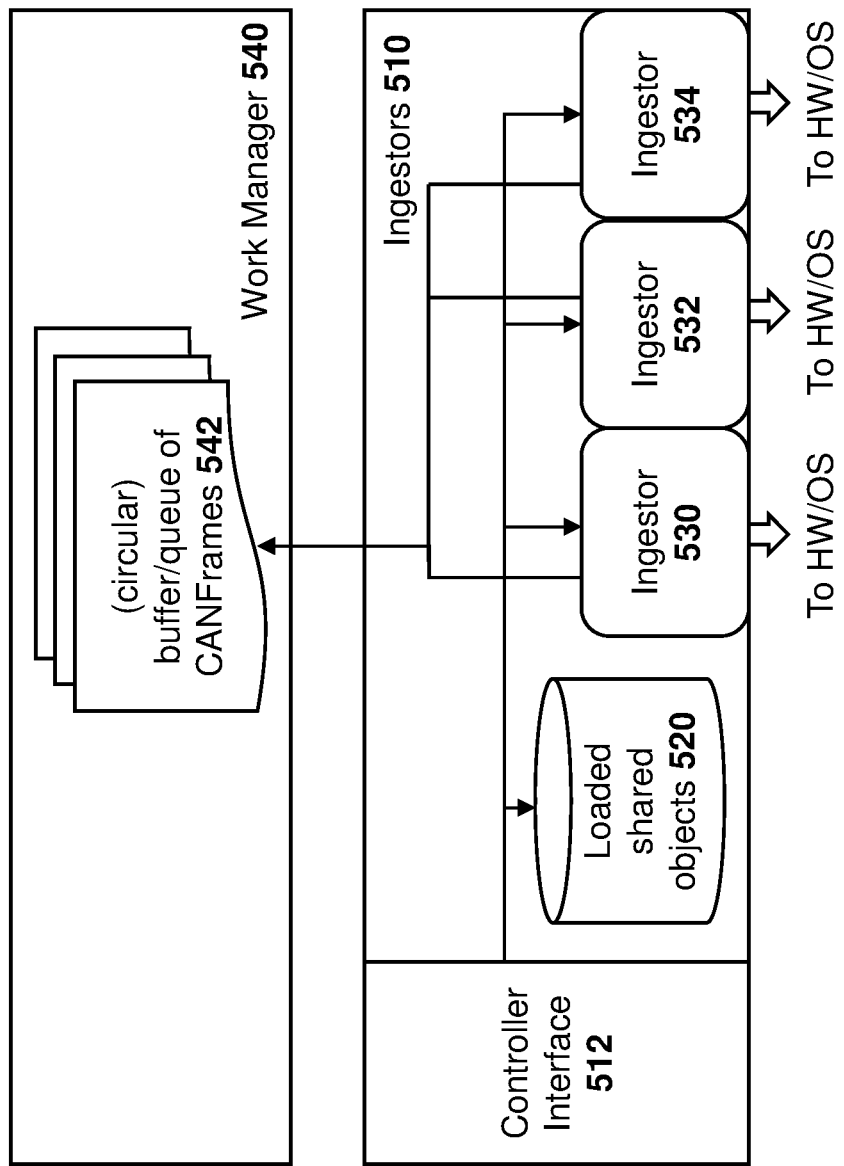
FIG. 5 is a block diagram of an ingestor block.

Reference is now made to FIG. 5, which shows ingestors functional block 510.

The ingestors functional block 510 consists of a number of ingestor instances that feed frames into a queue 542 owned by Work Manager 540 for retrieval by some other thread outside of the ingestors functional block 510. In particular, loaded shared objects repository 520 stores loaded shared objects within the ingestor functional block 510. Further, ingestor instances 530, 532 and 534 are shown in the example of FIG. 5.

Each ingestor instance is responsible for interacting with some underlying entity that provides frames to interested parties. This could be the operating system (OS) itself, for example via SocketCAN on Linux or IOCTL (input/output control) or QNX DEVCTL (Device Control) calls on QNX, other software interfaces like VSS (Vehicle Signal Specification) or Autosar, or even direct access to hardware. An ingestor is specialized for the underlying entity it communicates with.

For example, the frame may be a CANFrame, which may consist of: the CAN identifier (either 11 or 29 bit); the length of the payload; the actual payload bytes; a timestamp for when the frame was received (for example this could be nanoseconds since Unix epoch in some cases, but in other cases it could be a Greenwich Mean Time value, a time since another date, among other options); and an identifier for what source (what ingestor) it came from.

Code for the ingestors may be provided through loadable shared objects, stored in loaded shared objects repository 520. On start up, the configuration for the ingestor block may list what shared objects to load, and thus what sources are supported. Each shared object may expose a single API that provides a reference to a single factory class which can be used to construct an ingestor instance. For example, the API may be accessed via dlsym.

Configuration of an ingestor may be done at creation time and may come from a subsection of the ingestor block's configuration, shown as controller interface 512.

Each ingestor may have its own thread(s) that will be used to retrieve data from its source. The ingestor may then feed data via a supplied callback into the queue.

Control for the ingestor block may be exposed via an interface for the controller block's use. Once set up is complete, the controller may have limited control over ingestors, mostly relating to filtering, starting, and stopping such ingestors.

Each ingestor may support filtering. By default, an ingestor's filter may be empty and hence it may produce no output. A filter may be specified by a CANFrameFilter such as CANFrameFilter 430. For example, Message Acceptance Filtering may be done by applying a mask and a filter component to a CAN frame's identifier. Part or all of the CAN frame's identifier is matched against a combination of the filter and mask. If the result is equal the CAN frame is allowed and a CANFrame is produced and added to the CANFrame queue. In one embodiment, multiple filters can be specified and a CANFrame is produced if any of the filters accept the CANFrame.

Controller access to the ingestors functional block 510 may be managed by an Ingestors class, owned by the Controller. The Ingestors class may use a JSON configuration which, for example, details what shared objects to load, what ingestors to instantiate from the shared objects, and how to configure those shared objects.

Referring again to FIG. 3, ingestors provide data to a work manager 330. An example work manager is shown with regards to FIG. 6.

Figure 6:
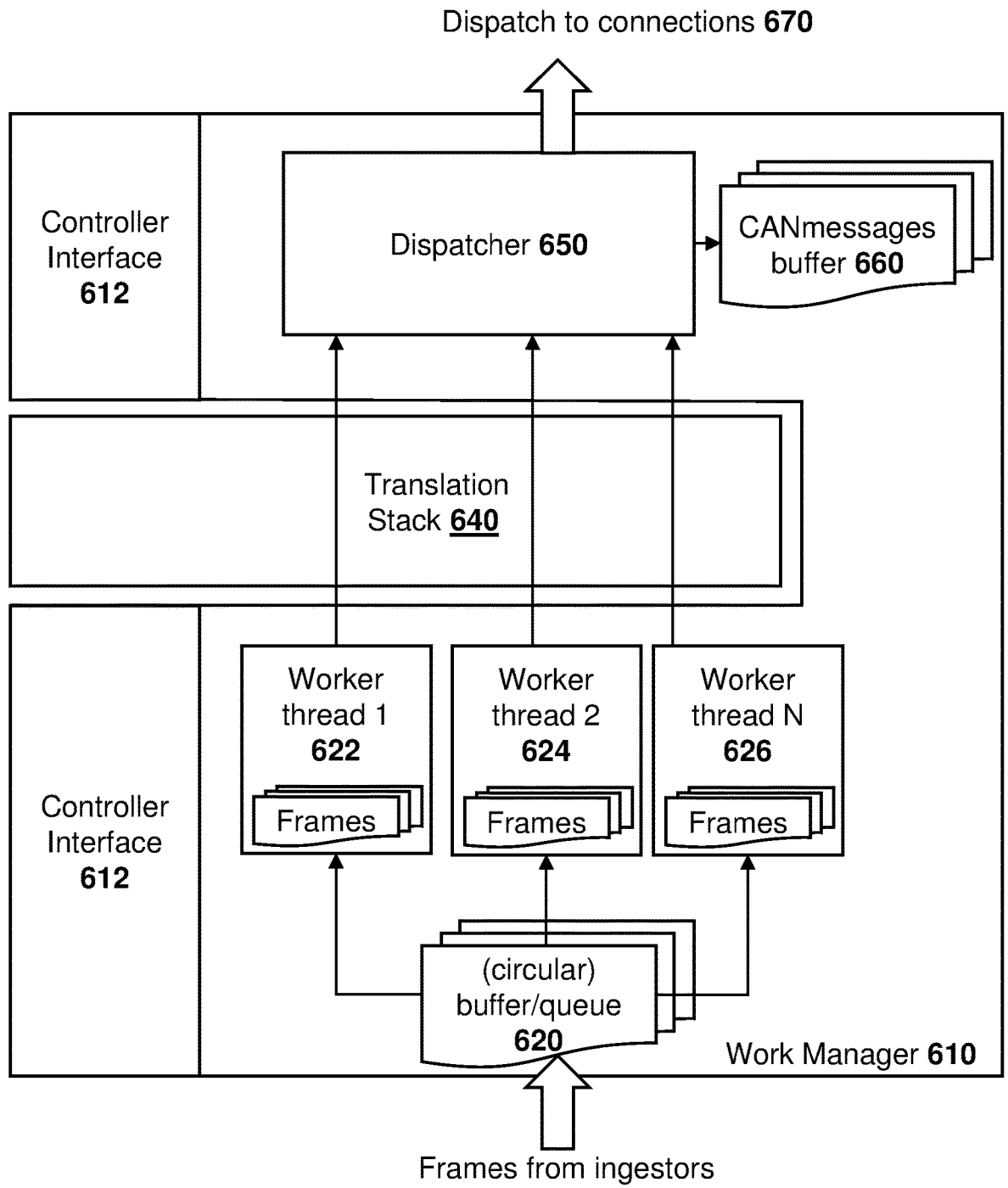
FIG. 6 is a block diagram of a work manager and translation stack.

In the example of FIG. 6, frames from ingestors are provided to work manager 610, and in particular to a buffer or queue 620. The work manager 610 is a functional block that is responsible for processing frames into messages (for example CANFrames into CANMessages), and then delivery of those messages to a Connections block.

The work manager 610 owns the queue 620 of frames and supplies an API to add frames to that queue.

The queue 620 of frames is a buffer of some kind. It is responsible for managing its size and concurrent access. It may in some embodiments be circular buffer, but this is optional. Queue 620 may receive frames from ingestors and provide sets of frames to calling worker threads.

In some embodiments, the number of frames to retrieve at one time may be set by the caller. The call to retrieve frames may block when no frames are available but may not block to fill the entire set size. In other words, if zero frames are available the calling thread will be blocked regardless of the number of frames requested, but if only one frame is available when five are requested the calling thread will not be blocked and will immediately return with the one available frame.

The example of FIG. 6 provides a multithread environment. However, this is optional, and in some embodiments a single thread environment may exist.

Queue 620 can provide frames to any of worker thread 622, worker thread 624 and worker thread 626. As will be appreciated by those in the art, the number of threads could vary from a single thread to a plurality of threads, and the example of FIG. 6 is not limiting.

The worker threads are responsible for processing each frame and pushing each frame through the translation stack 640 to create messages, as described below. Once pushed through the translation stack, each message is provided to a dispatcher 650. In a multithread environment, a message buffer 660 may exist to allow for messages to be ordered correctly.

Specifically, in a multithread environment, a worker thread may retrieve available frames, up to some configured maximum, and drive them through the Translation Stack 640 to create message instances. Once translation is done the same worker thread will deliver the messages if they are the next in sequence to be delivered. If they are not next in sequence, they will be temporarily stored into a messages buffer 660, after which the worker thread will start over with new frames.

Once a worker thread has delivered its own messages, it will check to see if messages in the buffer can now be delivered and, if so, deliver them before starting over with new frames.

Order may be maintained by assigning each frame being actively processed an identifier. Identifiers may be monotonically increasing and may be assigned at the point the frame is retrieved from the frame buffer. The identifier of a frame may be automatically assigned to any message generated from that frame. The work manager 610 tracks the next identifier that needs to be delivered. Once a message is created, if its identifier matches the next one to be delivered then the dispatcher block 650 will immediately send it to the Connections block. Otherwise it will be placed, in increasing identifier order, into the message buffer 660.

When a worker thread completes processing of a frame, if that frame had an identifier that matches the next identifier to be delivered, it may increase the next identifier to be delivered and check to see if the head message in the message buffer 660 has an identifier with an equal or lesser value than the next identifier. If so, the thread will remove it from the buffer and deliver the message. This continues as long as the head message in the message buffer 660 has an identifier that is less than, equal, or at most one more than the next identifier to deliver.

The next identifier to deliver may be increased by one whenever a message from the message buffer that has an identifier that is one greater than the next identifier to deliver.

The dispatcher may dispatch the messages to connections, as shown with message 670 in the embodiment of FIG. 6, and as described below with regard to FIG. 8.

In the embodiment of FIG. 6, the work manager 610 may be owned by a controller, shown with controller interface 612. At creation time the following information may be specified: a maximum number of frames to consume from the queue at once; a reference to the Translator Stack 640 instance; and/or reference to a Connections instance.

Figure 7B:
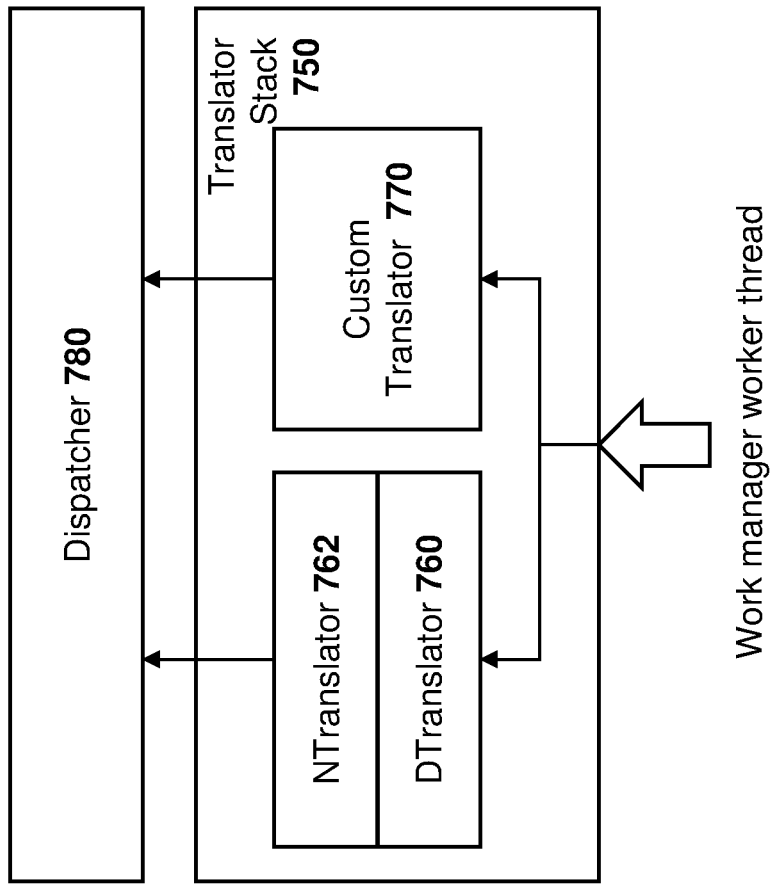
FIG. 7B is a block diagram of a second translation stack.
Figure 7A:
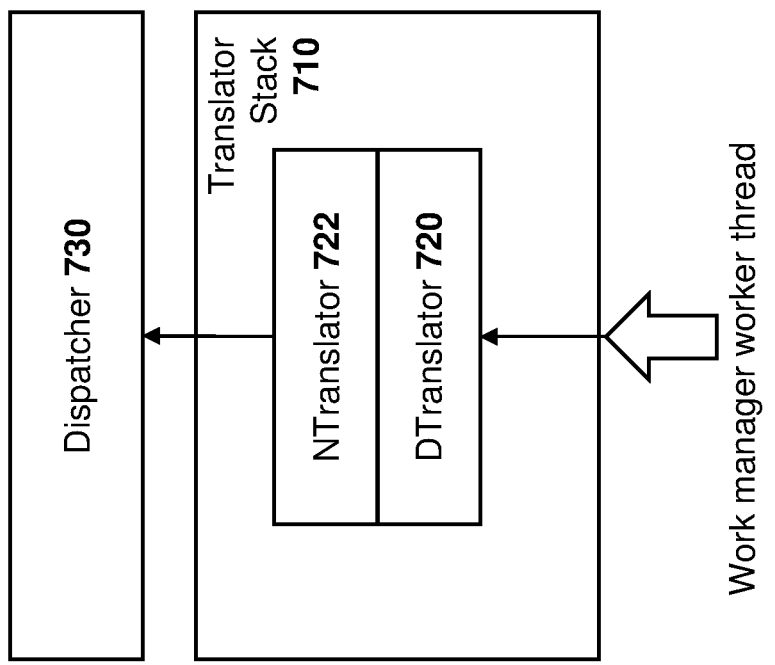
FIG. 7A is a block diagram of a first translation stack.

With regard to the translator stack, reference is now made to FIGS. 7A and 7B. The translator stack is responsible for taking frames and turning them into some final normalized form. The final form is generally an instance of a message, such as a CANMessage. The top of the translator stack connects to a sink that is part of the work manager.

A message may contain a timestamp and one or more signals (e.g. CANSignals). The timestamp may, for example, represent the number of nanoseconds since UNIX epoch and may be set to the value of the timestamp of the frame that caused the message to be generated. However, other options for a timestamp are possible. A signal (e.g. CANSignal) is simply a key/value pair with the key being a unique string and the value being one from a set of supported types.

A controller may be responsible for creating and managing the translator stack during start up. The stack is made up of Translator layers with each layer acting as both a source that produces outputs and a sink that it consumes inputs.

A source can only produce one type of output while a sink can only consume one type of input in one embodiment. The type may be defined by a string that may be the fully qualified class name of the type instance. The controller may ensure that there is no mismatch in types between a connected source and sink.

As seen in FIGS. 7A, a worker thread provides frames to the translator stack 710. In this embodiment, two translators are provided in the stack, namely DTranslator 720 and NTranslator 722.

DTranslator 720 may for example convert CANFrames into DBCIntermediateForm. Thus it is a source of DBCIntermediateForm and a sink of CANFrame in this example. This may be used, for example, because manufacturers may already have DBC files defining how to decode CAN frames. Manufactures may not want to share these files, but in such files the format is effectively standardized and the DBC file can be used as an input at runtime and be used to drive the initial translation.

However, the semantic output of DBC translation isn't standardized and thus a semantic mapping from the DBCIntermediate form to a normalized also may need to be performed. NTranslator 722 may for example convert DBCIntermediateForm into normalized instances wrapped into messages such as CANMessages. Thus it is a source of CANMessage and a sink of DBCIntermediateForm.

In some cases, this translation may also come from a manufacturer, and in this case the manufacturer may supply at least two files at runtime. A DBC file to define how to translate frames to their semantics and a file to define how to semantically understand their DBC output into a normalized form. These two files are correspondingly consumed by DTranslator 720 and NTranslator 722 and are specified as part of the system's configuration. Such files are shown as configuration files 244 and 246 in the embodiment of FIG. 2.

Output from the translation stack is provided to dispatcher 730.

While a normalized message is the usual final output of the translator stack it is not a required output. Custom shared objects may be created or supplied that expose an API capable of producing translator instances that can be used in the translator stack. This allows a manufacturer or other user to process CAN frames and produce non normalized instances with whatever method they may desire.

Specifically, reference is made to FIG. 7B. As seen in FIGS. 7B, a worker thread provides frames to the translator stack 750. In this embodiment, two translators are provided in the stack, namely DTranslator 760 and NTranslator 762.

DTranslator 760 and NTranslator 762 may be the same as DTranslator 720 and NTranslator 722 from FIG. 7A.

Further, in the embodiment of FIG. 7B, a custom translator 770 for custom shared objects may exist and have an API for the worker thread.

Output from NTranslator 762 or custom translator 770 is provided to dispatcher 780.

In both the embodiments of FIGS. 7A and 7B the translator stack may be involved with filtering. In this case, each layer of the stack has two responsibilities. The first is to only produce results that have been enabled by a filter. The second is to translate a filter request into a form understandable by the translator immediately below it in the stack; essentially running translation in the reverse direction.

The top of the translator stack accepts a signal filter that specifies a normalized message that the translator is requested to produce. Thus for example a CANMessageFilter specifying the "engine.normalizedForm.gps.latitude" will enable generation of latitude information.

The bottom of the translator stack may produce a vector of identifier/mask pairs, suitable for passing to an ingestor's add_filter API.

In one example, there might be something like the JSON code in Table 1 below to convert a message about GPS location information into a normalized form. In this case, if a vendor does not provide a translation for a given message then it will be ignored by the translator and thus will be dropped from the processing.

TABLE 1

Example JSON code for translation

```
{
   "messages": {
      "GPS" : {
         "signals" : {
            "GPSAccuracy" : {
               "fragment_name": " engine.normalizedForm.gps.accuracy",
               "fragment_type": "double",
               "fragment_scale": 0.01,
               "fragment_offset": 0
            },
            "GPSLongitude" : {
               "fragment_name": " engine.normalizedForm.gps.longitude",
               "fragment_type": "double",
               "fragment_scale": 0.000277778,
               "fragment_offset": 0
            },
            "GPSLatitude" : {
               "fragment_name": " engine.normalizedForm.gps.latitude",
               "fragment_type": "double",
               "fragment_scale": 0.000277778,
               "fragment_offset": 0
            }
         }
      }
   }
}
```

In Table 1 the DBC message name (in this case 'GPS') matches a message defined in the DBC file. The DBC Signal name (in this case 'GPSAccuracy', 'GPSLongitude', and 'GPSLatitude') matches signals defined in the DBC file.

Dispatcher 730 or dispatcher 780 provide their output to a connections block. In particular, reference is now made to FIG. 8.

Figure 8:
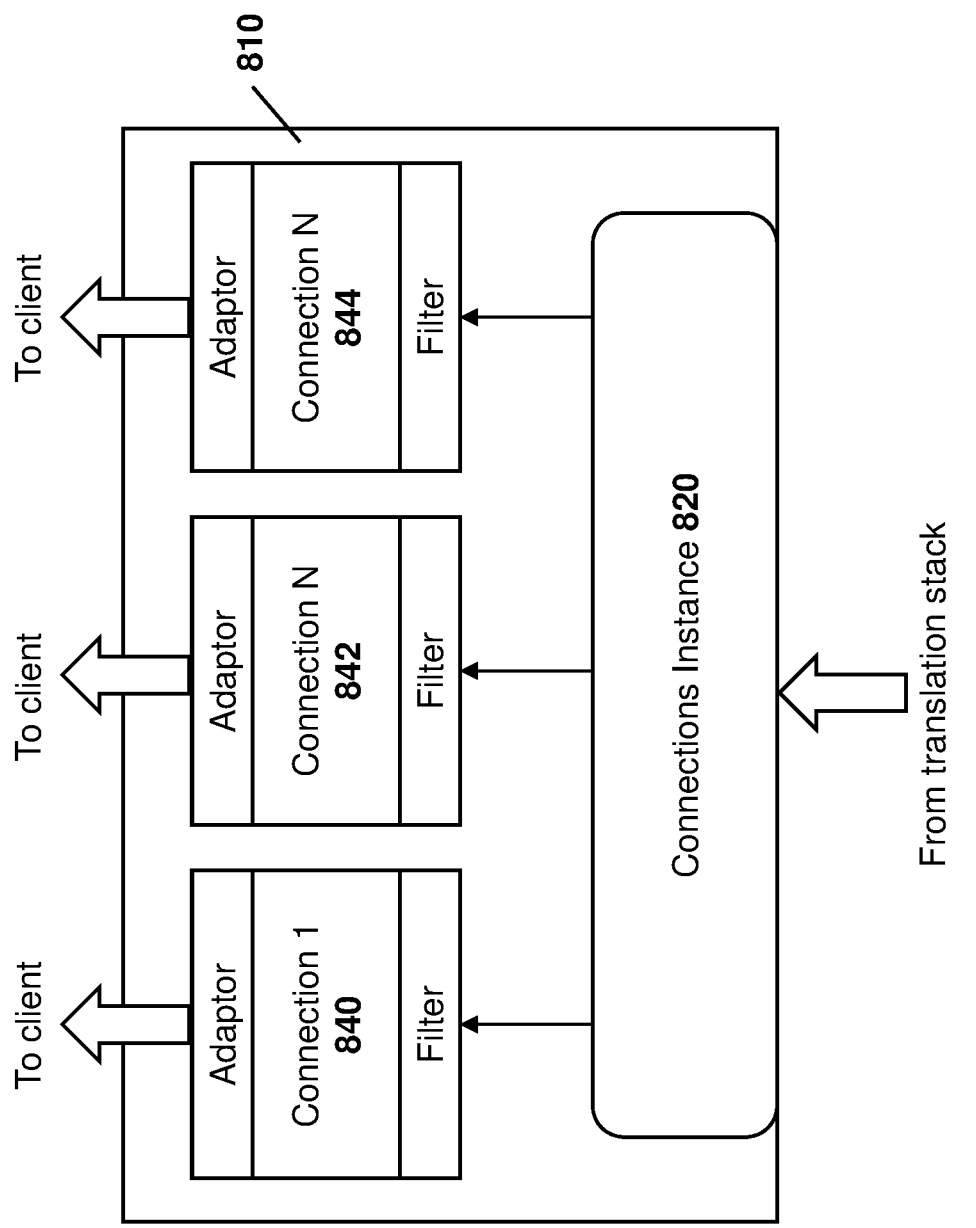
FIG. 8 is a block diagram of a connection block.

In the embodiment of FIG. 8, messages from the translations stack are provided to connections block 810 and, in particular, to a connections instance 820. The connections block 810 manages outgoing streaming connections to interested clients. The connection does any final filtering on presented messages, such as CANMessages, and forwards them to the client if the message passes filtering.

In one embodiment, the connections block 810 itself does not set up connections, and instead connections are given to it by the controller.

In the embodiment of FIG. 8, a plurality of connections may exist and be managed by the connections block 810. In particular, connections instance 820 may interact with a connection 840, a connection 842 and a connection 844. However, the use of three connections is merely provided for illustration and fewer or more connections are possible.

Connection 840 includes a filter to determine whether the message should be passed to the client. Further, an adapter may be added to the connection to adapt the output for a client.

Similarly, connections 842 and 844 may have filters and adapters.

Based on the above, entities such as different vehicles/vehicle platforms can be connected using an API with an instance of an ingestor. The instance can be created for the particular entity (e.g. vehicle/vehicle platform). The instance of the ingestor can convert data objects into frames for the translation stack. In the translation stack the frames can be converted into normalized messages, where such translation can be a multi-stage translation process.

Once the normalized messages are created they can be provided to client that has subscribed for such information.

The above may be implemented using any computing device. One simplified diagram of a computing device is shown with regard to FIG. 9. The computing device of FIG. 9 could be any fixed or mobile computing device.

Figure 9:
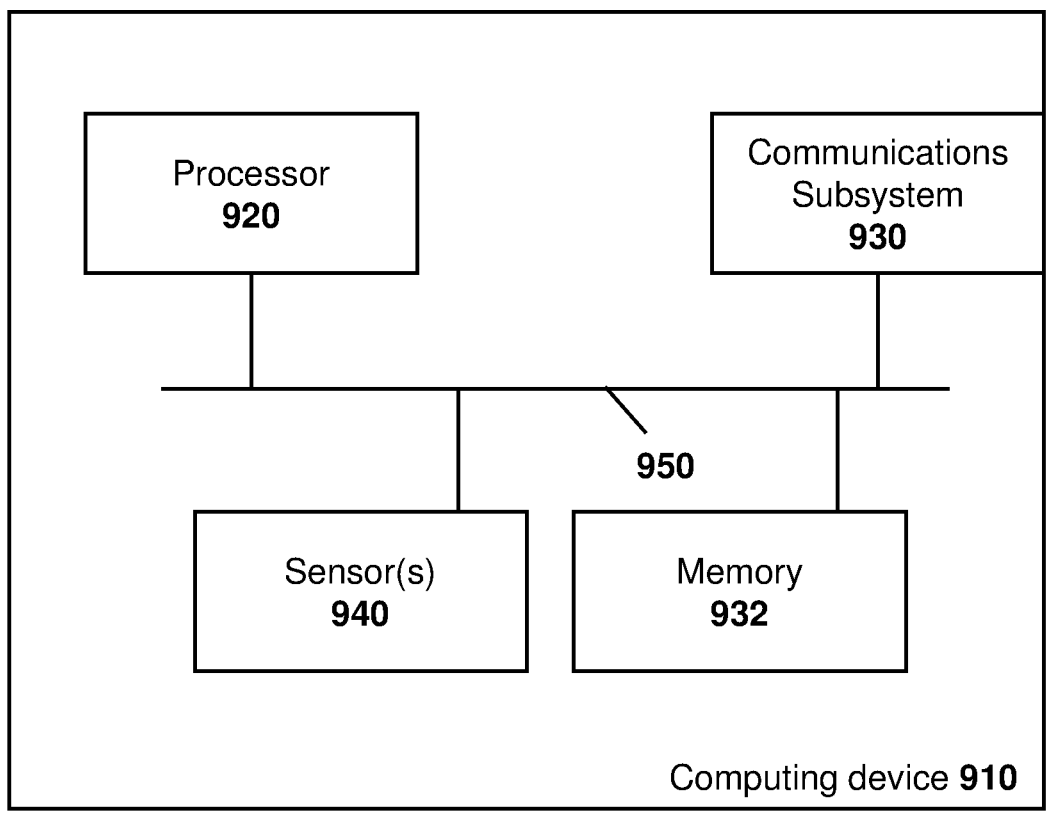
FIG. 9 is a block diagram of a simplified computing device capable of being used with the embodiments of the present disclosure.

In FIG. 9, device 910 includes a processor 920 and a communications subsystem 930, where the processor 920 and communications subsystem 930 cooperate to perform the methods of the embodiments described above. Communications subsystem 930 allows device 910 to communicate with other devices or network elements and may vary based on the type of communication being performed. Further, communications subsystem 930 may comprise a plurality of communications technologies, including any wired or wireless communications technology.

Processor 920 is configured to execute programmable logic, which may be stored, along with data, on device 910, and shown in the example of FIG. 9 as memory 932. Memory 932 can be any tangible, non-transitory computer readable storage medium which stores instruction code that, when executed by processor 920 cause device 910 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 932, device 910 may access data or programmable logic from an external storage medium, for example through communications subsystem 930.

In the example of FIG. 9, one or more sensors 940 may be associated with the computing device. However, this is optional and, in some cases, computing device 910 will not be associated with sensors.

Communications between the various elements of device 910 may be through an internal bus 950 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems, or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for providing vehicle data to a client, the method comprising:
   receiving, from an entity of a plurality of different entities, a data object at an ingestor block at the computing device, the ingestor block comprising a plurality of ingestor instances, each of the ingestor instances being tailored to receive data from only one entity of the plurality of different entities;
   converting the data object to a frame using a selected ingestor instance from the plurality of ingestor instances;
   providing the frame to a translation stack at the computing device to convert the frame into a normalized message; and
   providing the normalized message to the client;
   wherein the different entities have at least one of: different operating systems, different bus structures, or different hardware configurations.

2. The method of claim 1, wherein the different entities have different operating systems.

3. The method of claim 1, wherein the different entities have different bus structures.

4. The method of claim 1, wherein the different entities have different hardware configurations.

5. The method of claim 1, wherein the plurality of ingestor instances are created with an application program interface based on a shared objects repository and the different entities.

6. The method of claim 1, wherein the translation stack comprises a two stage translation to convert the frames first into an intermediate format and subsequently to the normalized message format.

7. The method of claim 6, wherein configuration files for each stage of the translation are provided by the different entities.

8. The method of claim 1, wherein frames from the ingestor block are placed into a circular buffer, and wherein the providing is done in a multi-thread process.

9. The method of claim 8, further comprising a buffer for normalized messages to ensure the normalized messages are sent to the client in a correct order.

10. The method of claim 1, further comprising filters for at least one of: each ingestor instance; and the translation stack; wherein the filters are used to determine whether a frame should be processed.

11. A computing device for providing vehicle data to a client, the computing device comprising:
   a processor; and
   a communications subsystem, wherein the computing device is configured to:
   receive, from an entity of a plurality of different entities, a data object at an ingestor block at the computing device, the ingestor block comprising a plurality of ingestor instances, each of the ingestor instances being tailored to receive data from only one entity of the plurality of different entities;
   convert the data object to a frame using a selected ingestor instance from the plurality of ingestor instances;
   provide the frame to a translation stack at the computing device to convert the frame into a normalized message; and
   provide the normalized message to the client;

wherein the different entities have at least one of: different operating systems, different bus structures, or different hardware configurations.

12. The computing device of claim 11, wherein the different entities have different operating systems.

13. The computing device of claim 11, wherein the different entities have different bus structures.

14. The computing device of claim 11, wherein the different entities have different hardware configurations.

15. The computing device of claim 11, wherein the plurality of ingestor instances are created with an application program interface based on a shared objects repository and the different entities.

16. The computing device of claim 11, wherein the translation stack comprises a two stage translation to convert the frames first into an intermediate format and subsequently to the normalized message format.

17. The computing device of claim 11, wherein frames from the ingestor block are placed into a circular buffer, and wherein the providing is done in a multi-thread process.

18. The computing device of claim 17, further comprising a buffer for normalized messages to ensure the normalized messages are sent to the client in a correct order.

19. The computing device of claim 11, further comprising filters for at least one of: each ingestor instance; and the translation stack; to determine whether a frame should be processed.

20. A non-transitory computer readable medium for storing instruction code, which, when executed by a processor of a computing device configured for providing vehicle data to a client, cause the computing device to:
    receive, from an entity of a plurality of different entities, a data object at an ingestor block at the computing device, the ingestor block comprising a plurality of ingestor instances, each of the ingestor instances being tailored to receive data from only one entity of the plurality of different entities;
    convert the data object to a frame using a selected ingestor instance from the plurality of ingestor instances;
    provide the frame to a translation stack at the computing device to convert the frame into a normalized message; and
    provide the normalized message to the client;
wherein the different entities have at least one of: different operating systems, different bus structures, or different hardware configurations.

\* \* \* \* \*